United States Patent [19]
Daubresse

[11] 3,857,607
[45] Dec. 31, 1974

[54] DEVICE FOR SHIFTING A BUCKET PIVOTED TO A VEHICLE

[75] Inventor: Henri-Jean Daubresse, Paris, France

[73] Assignee: Decauville, S.A., Corbeil-Essonnes, France

[22] Filed: May 9, 1973

[21] Appl. No.: 358,612

[30] Foreign Application Priority Data
May 24, 1972   France .............................. 72.18409

[52] U.S. Cl. ............................................. 298/22 J
[51] Int. Cl. ............................................. B61d 9/10
[58] Field of Search ........ 298/22 J, 22 D, 17.6, 17.7

[56] References Cited
UNITED STATES PATENTS
2,180,066   11/1939   Porter ............................... 298/17.7
3,043,629   7/1962   Schlueter .......................... 298/22 J
3,704,913   12/1972   Schuster ............................ 298/22 J FOREIGN PATENTS OR APPLICATIONS
259,837   5/1963   Australia ............................ 298/225

Primary Examiner—Robert B. Reeves
Assistant Examiner—Thomas E. Kocovsky
Attorney, Agent, or Firm—Holman & Stern

[57] ABSTRACT

The device comprises a compass-like arrangement having two arms and at least one hydraulic cylinder device having a relatively movable piston and cylinder. A first arm is pivoted to the chassis and the piston is pivoted to the bucket and also pivoted to a part of the second arm adjacent the free end of the second arm by a pivot separate from the pivotal connection of the piston to the bucket. The cylinder is pivoted to the first arm.

7 Claims, 2 Drawing Figures

PATENTED DEC 31 1974　　3,857,607

DEVICE FOR SHIFTING A BUCKET PIVOTED TO A VEHICLE

The present invention relates to transport vehicles of the tip-truck type in which a bucket or container is capable of being tipped rearwardly, laterally or along any one of its three sides.

Many devices are known which are capable of tipping such a bucket and in particular devices comprising a compass-like arrangement of two arms one of which is pivoted at its free end to the chassis of the vehicle whereas the other arm is pivoted at its free end to the bucket, a hydraulic cylinder device being interposed between the two arms to open and/or close the compass-like arrangement and thereby tip the bucket in the required direction.

An object of the present invention is to provide a device for shifting the bucket which has a smaller overall size than known devices and permits decreasing the height required between the chassis and the bottom of the body and which is particularly simple and light in construction.

This is obtained by employing a compass-like arrangement comprising two arms and a double-acting hydraulic cylinder device, wherein a first of the arms of said arrangement is pivoted to the chassis (or to the bucket), a first of the two relatively movable parts of the cylinder device is pivoted to the bucket (or to the chassis) and also connected to the free end of the second arm of said arrangement by a pivot separate from its pivotal connection to the bucket (or chassis) whereas the second part of the cylinder device is pivoted to the first arm of said arrangement.

In such an arrangement, the second arm operates solely under tension and consequently can be very light in construction.

According to another feature, the part of the cylinder device which is connected to the bucket (or chassis) can also be lightened and simplified in construction so that it is possible to still further reduce the height necessary between the chassis and the bottom of the body.

Further features and advantages of the invention will be apparent from the ensuing description with reference to the accompanying drawing.

In the drawing:

FIG. 1 shows a part of a transporting vehicle comprising a chassis C and a bucket or container B which is mounted on the chassis to pivot about at least one rear transverse axis (not shown in the drawing) and preferably about three axes, namely the rear transverse axis and two longitudinal and lateral axes.

Figure 1:
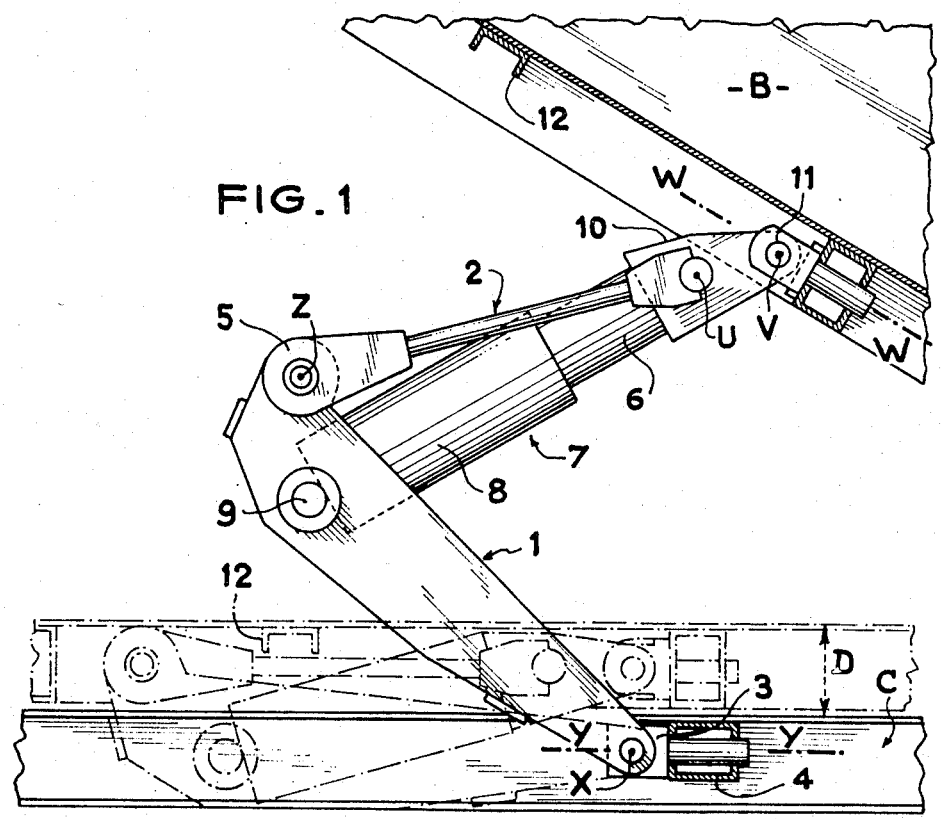
FIG. 1 is a side elevational view of a device for shifting a bucket according to the invention.

Provided between the chassis and the bucket is a device according to the invention which comprises a compass-like arrangement having two arms 1, 2, these arms being respectively constituted by two identical elements 1a, 1b; 2a, 2b, connected by cross-members. The lower arms, constituted by two levers 1a, 1b, is pivoted at the end thereof nearest to the chassis to a rocker 3 which is rotatably mounted on a cross-member 4 of the chassis. The two axes of rotation of the arm 1 on the rocker and of the rocker on the cross-member are perpendicular and designated respectively in FIGS. 1 and 2 by the references X—X and Y—Y. At its other end, each lower lever 1a, 1b is engaged in a fork 5 formed at the adjacent end of the elements 2a, 2b which constitute the upper arm 2 and which are constituted in the presently described arrangement by two connecting rods of light construction. The pivot axis of the two arms of the compass-like arrangement is designated by the reference Z—Z.

The connecting rods are connected at their other end to the piston 6 of an actuating cylinder device 7 to pivot about an axis U—U, the body 8 of the cylinder device being pivoted by a pin 9 between the two levers 1a, 1b. The piston 6 moreover comprises at its free end a member 10 pivoted to a fork 11 which is pivotably mounted on the bucket, the pivot axis V—V of the member 10 relative to the fork and the pivot axis W—W of the fork relative to the bucket being perpendicular to each other. Note that the axis U—U is separate from the axis V—V and located at a distance from the latter.

Figure 2:
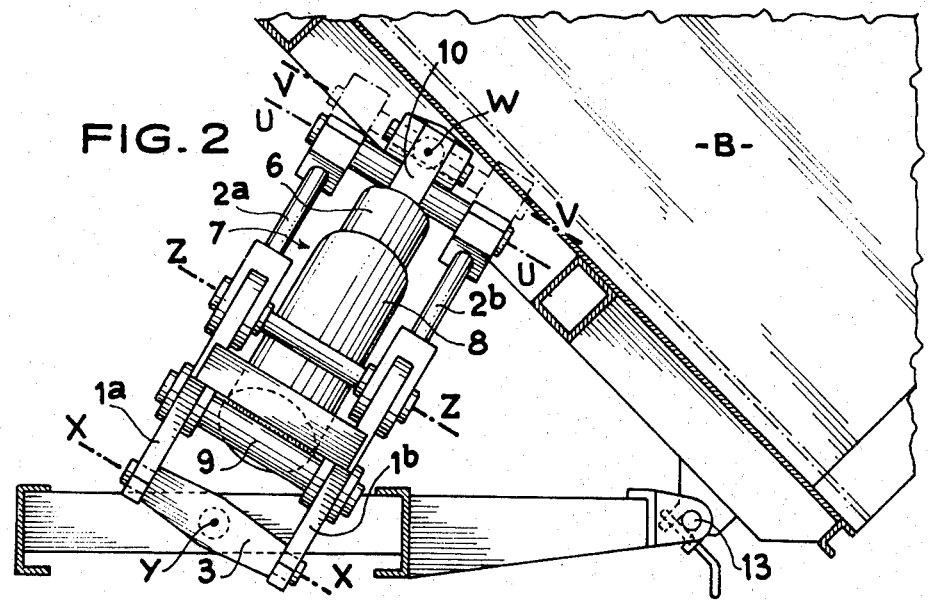
FIG. 2 is a rear elevational view of the device in the opened-out position in the case of a bucket which is capable of being tipped on its three sides.

Bearing in mind that the connecting rods 2a, 2b operate solely under tension when the compass-like arrangement is opened out, they can be light in construction which permits, as shown in FIG. 1, providing in this region, cross-members 12 for reinforcing the bucket without having to increase the distance D between the upper part of the chassis and the bottom of the body. This also permits a substantial saving in weight and reducing the price of the construction.

Further, bearing in mind that, firstly, the connecting rods are pivoted to the piston of the cylinder device to pivot about an axis U—U which is different from the axis V—V about which this piston pivots relative to the fork 11 connected to the bucket, secondly, no rocker such as the rocker 3 which connects the lower arms of the compass-like arrangement to the chassis, need be employed for pivoting the end of the piston of the cylinder device to the bucket and, thirdly, the simple fork 11 which is employed has an overall size very much smaller than that of such a rocker, the bottom of the body can be made nearer to the chassis and the saving in height is of the order of about 10 percent. It can be seen in FIG. 2 that the bucket is tipped on one of its longitudinal sides about an axis 13. The position of a conventional rocker and the corresponding position of the bottom of the body have been shown in dot-dash line. This advantage is essential since such a saving of space permits considerably increasing the capacity of the bucket for a given overall size or decreasing the overall size. Further, the stability of the assembly is improved.

Note that if the cylinder device 7 owing to its position works slightly under flexion essentially at the start of the opening out operation, it is very easy to construct this cylinder device in such manner that it can withstand this effort, for example by providing between the piston and the body of the cylinder device sufficient guide means. For example, it is sufficient to provide as guide means a ring located in the vicinity of the free end of the cylinder and another guide means received in a recess formed in the vicinity of the end of the piston remote from its pivot axis. The sealing elements provided between the piston and the cylinder can also be carried by the piston.

It is also possible to reverse the position of the cylinder device and pivot it between the upper arm of the compass-like arrangement and the chassis, the lower arm of the arrangement being then pivoted to the art of the cylinder device pivoted to the chassis.

Having now described my invention what I claim as new and desire to secure by Letters Patent is:

1. A device for shifting an element constituted by a bucket which is mounted to pivot on an element constituted by a chassis of a vehicle, comprising a compass-like arrangement of two pivotably interconnected arms having free ends, and a hydraulic cylinder device having a piston part and a cylinder part which are relatively slidable in a rectilinear path, a first of said arms being combined with a first pivot for pivotally connecting the first arm to a first of said elements, a first of said slidable parts having a rigid outer end portion combined with a second pivot for pivotally connecting the first part to a second of said elements and a third pivot combined with the end portion in spaced relation to the second pivot for pivotally connecting the first part to the second arm adjacent the free end of the second arm, a second of said parts being combined with a fourth pivot for pivotally connecting the second part to the first arm, the fourth pivot being intermediate the first pivot and the pivotal interconnection of the arms.

2. A device as claimed in claim 1, wherein the first part is a piston and the second part is a cylinder and the first element is said chassis and the second element is said bucket, the fourth pivot being adjacent the pivotable interconnection of the two arms.

3. A device as claimed in claim 1, wherein the first arm comprises two levers and the second arm comprises two connecting rods.

4. A device for shifting a bucket which is mounted on a chassis of a vehicle to pivot relative to the chassis on three sides of the bucket, comprising a compass-like arrangement of two pivotably interconnected arms having free ends, and a hydraulic cylinder device having a piston part and a cylinder part which are relatively slidable in a rectilinear path, a first of said arms being combined with a first pivot for pivotally connecting the first arm to the chassis, a first of said slidable parts having a rigid outer end portion combined with a second pivot and a third pivot combined with the end portion in spaced relation to the second pivot for pivotally connecting the first part to the second arm adjacent the free end of the second arm, a second of said parts being combined with a fourth pivot for pivotally connecting the second part to the first arm, the fourth pivot being intermediate the first pivot and the pivotal interconnection of the arms, a member pivotably connected to the bucket to pivot about a first axis and pivotably connected to the outer end portion by the second pivot to pivot about a second axis, the first axis being perpendicular to the second axis.

5. A device as claimed in claim 4, wherein the second arm is pivotably connected to the rigid outer end portion by the third pivot to pivot about an axis parallel to said second axis.

6. A transporting vehicle comprising an element constituted by a chassis, an element constituted by a bucket tippable relative to the chassis, and a device for tipping the bucket and comprising a compass-like arrangement of two pivotably interconnected arms having free ends, and a hydraulic cylinder device having a piston part and a cylinder part which are relatively slidable in a rectilinear path, a first of said arms being combined with a first pivot for pivotally connecting the first arm to a first of said elements, a first of said slidable parts having a rigid outer end portion combined with a second pivot for pivotally connecting the first part to a second of said elements and a third pivot combined with the end portion in spaced relation to the second pivot for pivotally connecting the first part to the second arm adjacent the free end of the second arm, a second of said parts being combined with a fourth pivot for pivotally connecting the second part to the first arm, the fourth pivot being intermediate the first pivot and the pivotal interconnection of the arms.

7. A transporting vehicle comprising a bucket tippable relative to the chassis and a device for tipping the bucket and comprising a compass-like arrangement of two pivotably interconnected arms having free ends, and a hydraulic cylinder device having a piston part and a cylinder part which are relatively slidable in a rectilinear path, a first of said arms being combined with a first pivot for pivotally connecting the first arm to the chassis, a first of said slidable parts having a rigid outer end portion combined with a second pivot for pivotally connecting the first part to the bucket and a third pivot combined with the end portion in spaced relation to the second pivot for pivotally connecting the first part to the second arm adjacent the free end of the second arm, a second of said parts being combined with a fourth pivot for pivotally connecting the second part to the first arm, the fourth pivot being intermediate the first pivot and the pivotal interconnection of the arms.

* * * * *